United States Patent
Maguire et al.

(10) Patent No.: US 7,661,313 B2
(45) Date of Patent: Feb. 16, 2010

(54) ACCELERATION STRAIN TRANSDUCER

(75) Inventors: Jason M. Maguire, Middetown, RI (US); Gregory H. Ames, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 78 days.

(21) Appl. No.: 11/934,846

(22) Filed: Nov. 5, 2007

(65) Prior Publication Data

US 2009/0114031 A1    May 7, 2009

(51) Int. Cl.
*G01P 15/08*    (2006.01)
(52) U.S. Cl. ................... 73/514.16; 73/514.26
(58) Field of Classification Search .............. 73/514.16, 73/514.33, 514.34, 514.26, 514.29, 763–768, 73/774–783, 862.59; 356/32–34, 35.5; 250/227.27, 250/227.19, 227.15
See application file for complete search history.

(56) References Cited

U.S. PATENT DOCUMENTS

| | | | | |
|---|---|---|---|---|
| 4,173,412 A | * | 11/1979 | Ramsay et al. ................. 356/33 |
| 4,480,480 A | * | 11/1984 | Scott et al. ..................... 73/769 |
| 4,876,447 A | * | 10/1989 | Killian ................... 250/227.19 |
| 4,878,417 A | * | 11/1989 | Facon ........................ 91/363 R |
| 5,174,159 A | * | 12/1992 | Jacobsen et al. .............. 73/767 |
| 5,275,055 A | * | 1/1994 | Zook et al. ..................... 73/778 |
| 5,559,358 A | * | 9/1996 | Burns et al. .................. 257/431 |
| 5,747,692 A | * | 5/1998 | Jacobsen et al. ......... 73/514.25 |
| 7,380,454 B2 | * | 6/2008 | Dwyer et al. ............ 73/514.28 |

\* cited by examiner

*Primary Examiner*—Helen C. Kwok
(74) *Attorney, Agent, or Firm*—James M. Kasischke; Michael P. Stanley; Jean-Paul A. Nasser

(57) ABSTRACT

An accelerometer is provided including a strain sensor with a substantially linear configuration. The strain sensor is mounted on a transducer such that the strain sensor extends laterally across the transducer. The transducer has a base and a plurality of flaps joined at a first end to the base and supporting the strain sensor at a second end. The flaps translate acceleration in a predefined direction to strain in the strain sensor. Further embodiments have flaps defining an interrupted surface with greater height at the center and flaps that have features for enhancing the strain caused by acceleration.

13 Claims, 2 Drawing Sheets

ACCELERATION STRAIN TRANSDUCER

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to instruments and more particularly to a transducer that can be used with a strain sensor to make an accelerometer.

(2) Description of the Prior Art

Traditional electrical accelerometers use a magnetic mass supported by a spring in a housing. An induction coil is wound around the interior of the housing. Acceleration is sensed by measuring the electromotive force induced in the induction coil by movement of the magnetic mass. Piezoceramic transducers use a piezoelectric effect to produce a low voltage output in response to force. These sensors usually require a preamplifier to be placed in close proximity. In remote applications, especially those involving arrays of accelerometers, the preamplifiers and telemetry combining signals for transmission to the receive site, can be large and a major factor in the system expense.

Fiber optic sensor systems remove the requirement for preamplification and electronic telemetry. Very low sensitivity accelerometers are based on the acceleration causing two optical waveguides to be misaligned, thus varying the intensity of the light signal. Other accelerometers use large coils of tens of meters of optical fiber. The large amount of fiber and the limited bend diameter of the fiber limit these to fairly large sizes.

Another type of optical accelerometer uses a fiber optic segment positioned between a base and a ridged reaction mass. Acceleration causes the reaction mass to pinch the fiber optic segment against the base. Acceleration can be measured by measuring the modulation of the light passing through the fiber optic segment.

Sometimes it is more convenient to measure strain, and a conventional technique is the use of a force transducer to translate acceleration into strain. Strain sensors include a foil strain gauge having a plurality of foil traces on a backing material. This gauge is mounted on an object to measure elongation of the object. Strain is measured by measuring the increased resistance in the strain gauge. Another linear electrical strain sensor can be constructed by providing mercury or some other conductive material in an elastomeric tube. The elastomeric tube is mounted to the object. Stretching of the tube results in a narrowing of the cross-sectional area which increases electrical resistance in the conductive material. This resistance can be measured giving an indication of strain.

A fiber optic sensor can also be used to measure strain. A piece of fiber optic is provided that has a Bragg grating written in the fiber optic at either end of a sensing region. The sensing region is mounted to an object being measured, and elongation of the sensor can be measured by providing light pulses at a known interval in the fiber optic and collecting the reflected pulses. Elongation of the fiber optic sensor region causes a measurable delay in the pulses.

Navy Case No. 97966, which is incorporated by reference herein, teaches use of a fiber optic laser to measure strain. FIG. 1, below, has additional details concerning the use of fiber laser sensors.

As discussed herein, there is provided an accelerometer having a transducer that can be used with a variety of strain sensors.

SUMMARY OF THE INVENTION

Accordingly, there is provided an accelerometer including a strain sensor with a substantially linear configuration. The strain sensor is mounted on a transducer such that the strain sensor extends laterally across the transducer. The transducer has a base and a plurality of flaps joined at a first end to the base and supporting the strain sensor at a second end. The flaps translate acceleration in a predefined direction to strain in the strain sensor. Further embodiments have flaps defining an interrupted surface with greater height at the center and flaps that have features for enhancing the strain caused by acceleration.

BRIEF DESCRIPTION OF THE DRAWINGS

The foregoing invention will become readily apparent by referring to the following detailed description and the appended drawings in which.

DESCRIPTION OF THE INVENTION

Figure 1:
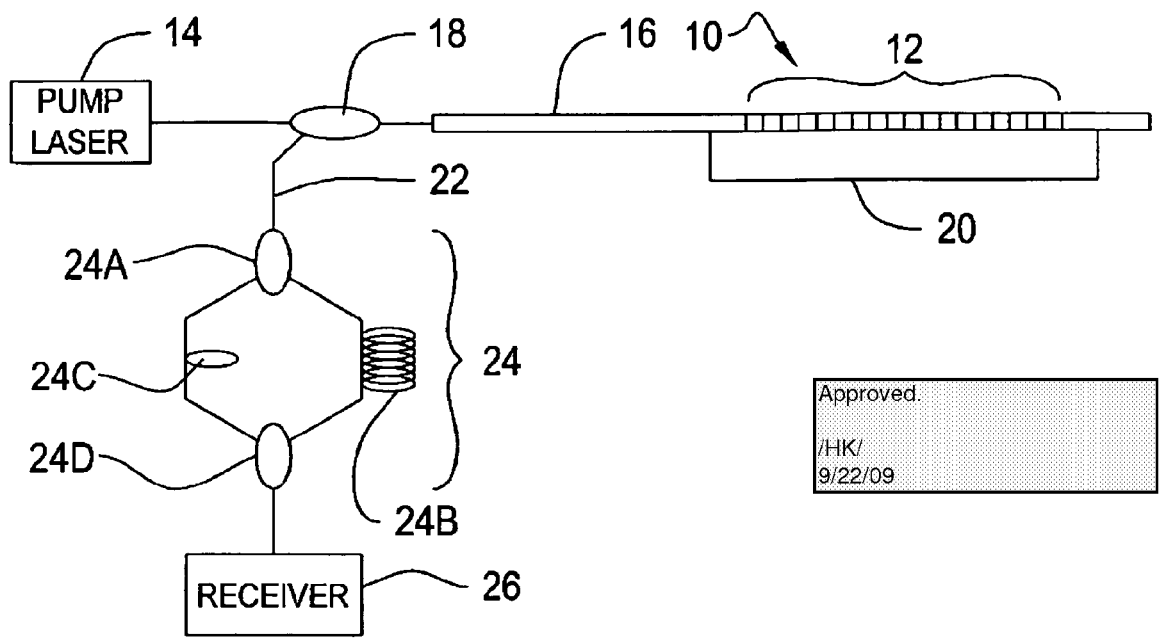
FIG. 1 is a diagram showing a fiber optic laser sensor accelerometer.

FIG. 1 shows an accelerometer utilizing a fiber laser sensor. The fiber laser accelerometer 10 includes a fiber laser 12. Fiber laser 12 can be either a Fabry-Perot type cavity fiber laser or a distributed feedback fiber laser. In a Fabry-Perot type fiber laser, the laser cavity is a length of erbium-doped optical fiber with a Bragg grating written in the fiber core at either end of the laser cavity. In a distributed feedback fiber laser, the fiber laser cavity is a length of erbium-doped optical fiber having a grating written over the full length of the cavity. The distributed feedback fiber laser will have a phase shift at the center of the cavity. A pump laser 14 is provided for transmitting coherent light through optical fiber 16. Pump laser 14 can be any laser such as a diode laser operating at 980 nm or 1480 nm. Pump laser 14 is joined by fiber 16 to a distributor 18. Distributor 18 can be a wavelength division multiplexer, circulator or the like. A wavelength division multiplexer operates by providing light at the pump laser wavelength to the fiber laser 12. Returning light from the fiber laser 12 is at a different frequency and is guided along a different path. A circulator can carry out the same function by transferring light to the next port of the circulator.

After coherent light passes through distributor 18, it is absorbed by the doping material in fiber laser 12. Absorption of this light causes the doping material to emit photons which are gathered by resonance between the gratings. This causes fiber laser 12 to emit a narrow single mode of light. Fiber laser 12 is mounted to a transducer 20 such that acceleration of the transducer material strains the fiber laser cavity. This strain shifts the emission wavelength of the fiber laser 12. Transducer 20 can have a wide variety of constructions that will be discussed hereinafter.

Fiber laser emission returns along fiber 16 to wavelength division multiplexer 18 where it is separated onto analysis path 22. An interferometer 24 such as a Mach-Zehnder interferometer is positioned on analysis path 22. Interferometer 24 converts the shifted emission wavelength of fiber laser into a phase shift of the fiber laser light. Interferometer 24 typically includes a first beam splitter 24A having a delay loop 24B on one leg and a modulator 24C on the second leg. Signals from the delay loop 24B and modulator 24C are combined in a second beam splitter 24D to produce the phase shifted signal. Other interferometer designs can produce the same type of signal. A receiver 26 receives the phase shifted signal. Receiver 26 is capable of demodulating and detecting the signal from the fiber laser by various methods well known in the art.

Figure 2:
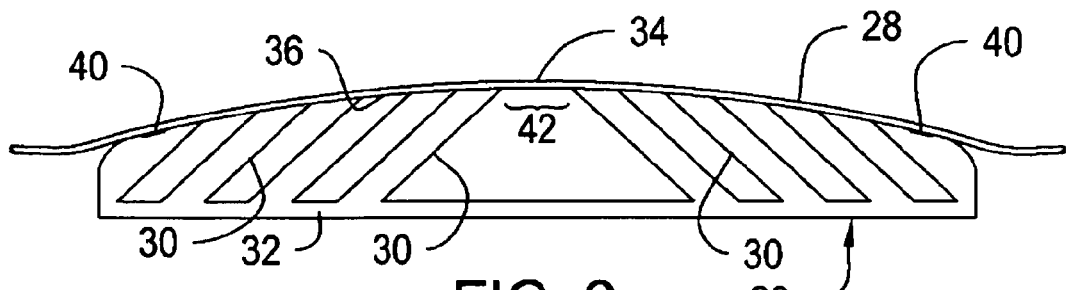
FIG. 2 is a diagram showing an accelerometer having a transducer constructed according to a first embodiment.

FIG. 2 provides a first embodiment of transducer 20. Transducer 20 can be used with any linear strain sensor 28. These include foil resistance strain sensors, conductive liquid strain sensors, optical delay strain sensors, fiber laser strain sensors, or the like. Transducer 20 functions to translate acceleration into strain in strain sensor 28.

The first embodiment of transducer 20 has at least one flap 30. Flap 30 is attached to a base 32 of the transducer 20 and extends toward a center 34 of strain sensor 28 at an angle. Equal numbers of flaps 30 can be provided on each side of center 34, and all flaps 30 angle toward the center 34. Transducer 20 can be made from a polymer material. Transducer 20 allows vertical movement of flaps 30, as shown, but resists movement in the transverse direction because of its geometry. Movement in the longitudinal direction cannot be controlled without affecting the vertical motion induced by acceleration. The affect of the longitudinal motion tends to cancel out because of the flap arrangement. The volume in between flaps 30 can be a vacuum, gas, liquid, or solid; however, it should allow movement of flaps 30. A gas, liquid or solid could provide damping, if necessary. In this embodiment, the combined top surfaces 36 of the flaps 30 form an interrupted surface 38 that is higher near center 34. Sensor 28 is mounted under tension across the top surfaces 36 of the flaps 30 and fixed to the outer two flaps with an adhesive 40 such as ultra-violet cured epoxy. Adhesive 40 should not interfere with sensor 28. Mounting to the outermost flaps 30 reduces the constraint on the ends of the sensor 28 and yields greater sensitivity to acceleration.

Increasing the height of interrupted surface 38 near center 34 allows sensor 28 contact with all of the flap upper surfaces 36. Friction holds the sensor 28 in place laterally. The body of each flap 30 serves as an inertial mass. When transducer 20 is accelerated away from sensor 28, flaps 30 move toward sensor 28 and outward from the center 34 due to the angle of the flaps 30. This causes an unsupported portion 42 of the sensor 28 between the centermost two flaps 30 to be further tensioned. The outer flaps 30 move with the inner flaps 30 and produce additional strain on the fiber portion at center 34. The flaps 30 have sufficient width in the direction perpendicular to the direction being sensed to ensure that the flaps 30 are much more stiff against motion in that direction. This stiffness in the transverse direction ensures that the accelerometer 10 has good isolation against responding to accelerations in that direction, known as cross-axis isolation. Transducer 20 structure also provides good isolation against longitudinal accelerations in the direction parallel to sensor 28. In this direction, the half of the flaps 30 on one side of the center 34 move upward and outward, while the half of the flaps 30 on the other side of the center 34 move downward and inward. These two motions tend to cancel, producing little net strain on the center 34 of the sensor 28.

The unsupported fiber portion 40 between the center two flaps 30 can also vibrate in a string mode. This mode is undesirable because it is equally susceptible to acceleration in both directions transverse to the sensor 28. Thus, it is desirable to minimize this mode and push its resonance to a frequency above that in the sensing range. The response of this mode is controlled by mounting the sensor 28 to the transducer 20 with sufficient tension.

A transducer of this form is basically a mass/spring system operated well below resonance. In an idealized mass/spring system the natural or resonant frequency of the system is given by the following equation:

$$\omega_n = \left(\frac{K}{M}\right)^{\frac{1}{2}} \quad (1)$$

where $\omega_n$ is the natural frequency, M is the mass, and K is the spring stiffness. A harmonic acceleration can be given by the following equation:

$$a = a_0 \cos \omega t \quad (2)$$

Under these conditions, the displacement of the mass, M, is harmonic with amplitude X given by:

$$X = \frac{\frac{M a_0}{K}}{\left(1 - \left(\frac{\omega}{\omega_n}\right)^2\right)} \quad (3)$$

The sensitivity of a sensor based on this system is given by $S = X/a_0$. At frequencies well below the resonant frequency, $\omega_n$, this is approximated by:

$$S = \left(\frac{X}{a_0}\right) = \frac{M}{K} \quad (4)$$

In the accelerometer, the maximum strain on the sensor 28 is related to the maximum displacement of the flap 30 masses. It can be seen from these equations that both resonant frequency, $\omega_n$, and displacement X (or sensitivity S) are directly related to the ratio K/M. If the system is designed for a particular resonant frequency to give a desired bandwidth sensor, the sensitivity is predetermined. In general, it is desired that the sensitivity S be maximized for a particular resonant frequency. These equations indicate that this is not possible for the idealized mass spring system. However, in a non-idealized system not consisting of a point mass, the limitation on displacement refers to the motion of the center of mass. If a rigid, low mass lever arm is used to connect to the sensor 28, it becomes possible for the sensor 28 to experience greater displacement than the center of mass, thus increasing the sensitivity to bandwidth tradeoff. The second embodiment uses such a lever arm.

Figure 3:
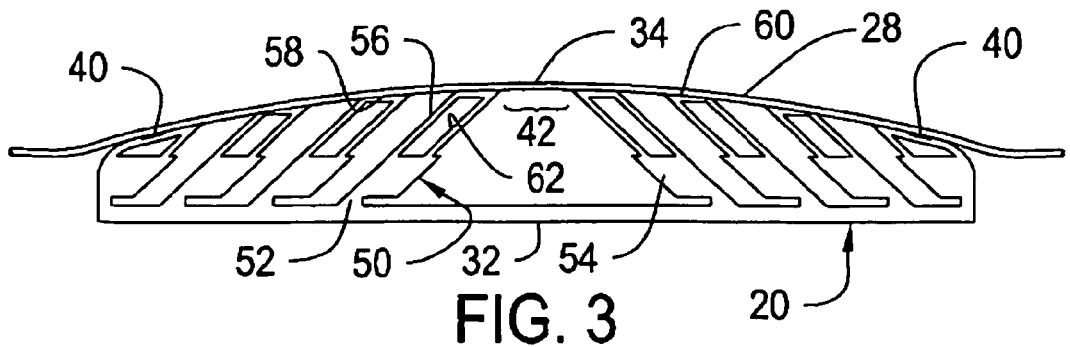
FIG. 3 is a diagram showing an accelerometer having a transducer constructed according to a second embodiment.
Figure 4:
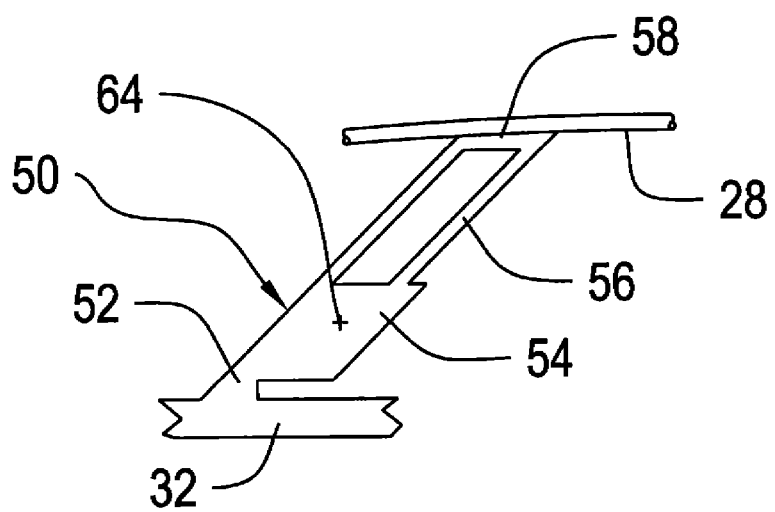
FIG. 4 is a diagram showing a detail view of a portion of the transducer shown in FIG. 3.

FIG. 3 shows a second embodiment of transducer 20, and FIG. 4 provides a detail view of a single flap 50. As above, a sensor 28 is fixed to the top of transducer 20. This embodiment of transducer employs flaps 50 having a neck 52 joined to base 32 and flap mass 54. Neck 52 is a thinned portion of the flap 50 which acts to reduce the spring constant K of the flap. A lever arm 56 is positioned on the top surface of flap mass 54. Lever arm 56 provides top surface 58 for supporting sensor 28. The top surfaces 58 of the combined flaps form a surface 60. Surface 60 is typically further from base 32 at the center flaps 50 to allow tension in sensor 28 to hold sensor 28 against flap top surfaces 58. Lever arm 56 has a cavity 62 formed therein for reducing mass. Cavity 62 can be any shape that maintains the rigidity of lever arm 56. Lever arm 56 can also be thinner in the transverse dimension to reduce mass because sufficient stability is provided in this dimension by base 32, neck 52 and flap mass 54. Flaps 50 extend at an approximately 45 degree angle from base 32 toward center 34 of sensor 28. Sensor 28 can be mounted on the two outer flaps 50 farthest from center 34.

Referring now to the detailed view of flap 50 provided in FIG. 4. Because of the relative mass of the flap mass 54 and lever arm 56, center of mass 64 is relatively low in flap 50. The distance from base 32 to the center of mass 64 is less than the distance from base 32 to sensor 28. The ratios of these distances is the ratio by which the displacement of the sensor is increased over the displacement of the center of mass 64. The flap mass 54 serves as an inertial mass. When the transducer 20 is accelerated downward, the flaps 50 move upward and outward from the center 34. Effectively the flap mass 54 and lever arm 56 pivot on neck 52. This causes that portion of sensor 28 between the centermost two flaps 50 to be further strained, increasing strain in sensor 28. The resonant frequency is determined by the flap stiffness and can be controlled by the shape, mass, and material. The thickness of the neck 52 at the base of the flap 50 can also be used to control the stiffness. The equations describe the relationship of this resonant frequency to the motion of the center of mass. The strain is enhanced by the lever arm by the ratio of the distances discussed above. This provides a sensor that has greater sensitivity for a given bandwidth.

Figure 5:
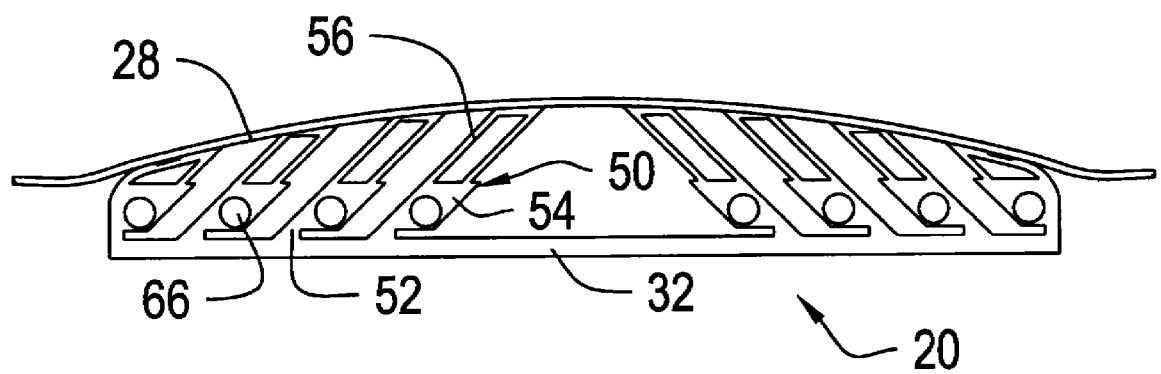
FIG. 5 is a diagram showing an accelerometer having a transducer constructed according to a third embodiment.

In a third embodiment, shown in FIG. 5, transducer 20 is provided with an additional feature for increasing the mass of the flap mass 54 and lowering its center of gravity. A weight 66 made from a denser material is positioned in flap mass 54.

Figure 6:
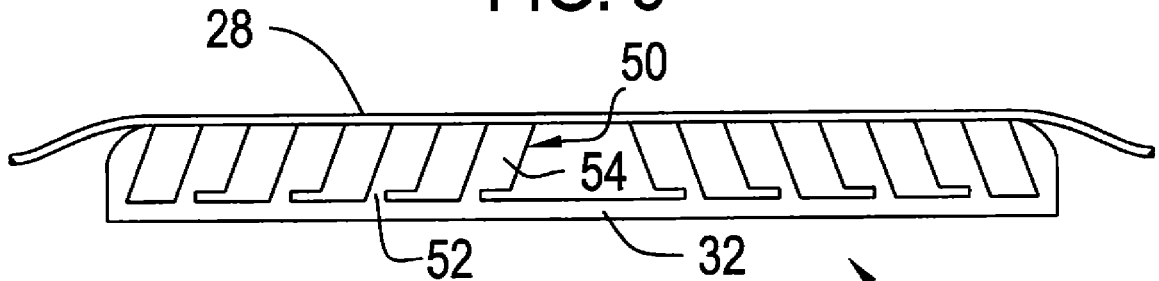
FIG. 6 is a diagram showing an accelerometer having a transducer constructed according to a fourth embodiment.

In a fourth embodiment, shown in FIG. 6, flap upper surfaces 58 form a straight interrupted surface. Sufficient contact may be caused by acceleration for flaps 50 to apply tension to sensor 28. Flaps 50 are constructed with necks 52 joining flap mass 54 to base 30. Lever portions 56 are omitted in this embodiment.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An accelerometer comprising:
    a strain sensor having a substantially linear configuration; and
    a transducer joined to said strain sensor such that said strain sensor extends laterally across said transducer, said transducer having a base extending along said strain sensor and provided rigidity of said transducer in at least one direction perpendicular to a predefined direction, and a plurality of flaps joined at a first end to the base and supporting said strain sensor at a second end, the flaps being capable of translating acceleration in the predefined direction to strain in said strain sensor.

2. The device of claim 1 wherein said flaps of said transducer are angled from said base of said transducer toward a center of said strain sensor.

3. The device of claim 2 wherein said transducer has the same number of said flaps of said transducer on either side of said strain sensor.

4. The device of claim 2 wherein said second ends of said flaps of said transducer provide an interrupted surface with an increasing height from said base of said transducer and having a maximum height at the center of said strain sensor for supporting said strain sensor.

5. The device of claim 1 wherein said transducer further has mounting portions on either end of said transducer, said strain sensor being joined to said mounting portions of said transducer.

6. The device of claim 1 wherein each said transducer flap comprises:
    a flap mass having an enhanced mass proximate the base of said transducer; and
    a lever portion extending outward from said flap mass and having a sensor support for supporting said strain sensor, said lever portion having a reduced mass.

7. The device of claim 6 wherein said flap mass and said lever portion are structured with respect to a flap center of gravity such that the distance between the base and the flap center of gravity is less than the distance between the center of gravity and said sensor support of said lever portion.

8. The device of claim 7 wherein said base of said transducer and said flap mass have a first thickness and said lever portion has a second thickness, said second thickness being less than said first thickness.

9. The device of claim 6 wherein each said flap further comprises a neck positioned between said flap mass and said base, said neck creating a reduced stiffness for deflection of said flap.

10. The device of claim 9 wherein said base of said transducer, said flap mass and said neck have a first thickness and said lever portion has a second thickness, said second thickness being less than said first thickness.

11. The device of claim 6 wherein each said flap further comprises a weight positioned in said flap mass for increasing the mass of said flap mass.

12. The device of claim 1 wherein the strain sensor is a selected one of a fiber optic laser strain sensor, a fiber optic strain sensor, a foil strain sensor or a liquid filled tube strain sensor.

13. The device of claim 1 wherein the strain sensor is joined on said transducer under tension.

* * * * *